United States Patent [19]

Katsumoto et al.

[11] 3,891,680

[45] June 24, 1975

[54] MALEIC ANHYDRIDE RECOVERY USING NONAQUEOUS MEDIUM

[75] Inventors: Kiyoshi Katsumoto, El Cerrito; Wilton H. Lind, Petaluma, both of Calif.

[73] Assignee: Chevron Research Company, San Francisco, Calif.

[22] Filed: Nov. 29, 1972

[21] Appl. No.: 310,320

[52] U.S. Cl. ............................ 260/346.8 M; 55/48
[51] Int. Cl. .............................................. C07c 57/14
[58] Field of Search ........................... 260/346.8 M

[56] References Cited
UNITED STATES PATENTS
2,574,644  11/1951  Landau ........................... 260/346.8

FOREIGN PATENTS OR APPLICATIONS
869,297  5/1961  United Kingdom............. 260/346.8

Primary Examiner—Henry R. Jiles
Assistant Examiner—Bernard I. Dentz
Attorney, Agent, or Firm—G. F. Magdeburger; John Stoner, Jr.; T. G. DeJonghe

[57] ABSTRACT

A process for the recovery of maleic anhydride from gaseous mixtures containing the anhydride and water vapor by contacting the mixture with dialkyl phthalate esters having 4 to 8 carbon atom alkyl groups and a total of 10 to 14 carbon atoms in both alkyl groups, at a temperature in the range of 55°C. to 260°C. under sufficient pressure for absorption of the maleic anhydride.

16 Claims, 1 Drawing Figure

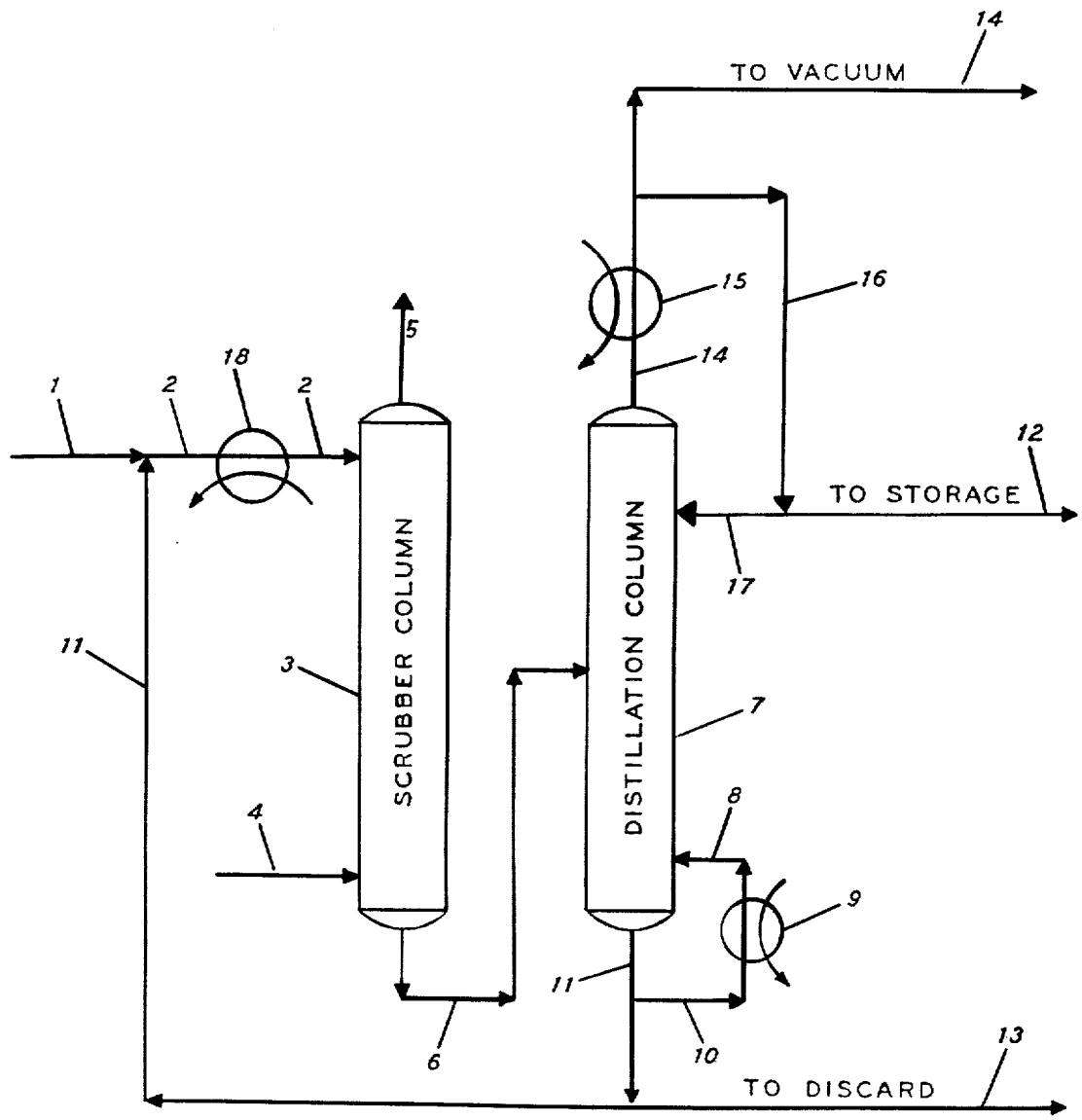

MALEIC ANHYDRIDE RECOVERY USING NONAQUEOUS MEDIUM

BACKGROUND OF THE INVENTION

1. Field of the Invention

This invention is concerned with an improved process for the recovery of maleic anhydride from hot vaporous or gaseous mixtures, such as result from the vapor phase oxidation of suitable hydrocarbon feeds. In particular it is concerned with a liquid absorption of maleic anhydride by certain dialkyl phthalates having alkyl groups of a critical carbon content.

2. Prior Art

Maleic anhydride is usually made by the vapor-phase air oxidation of an appropriate hydrocarbon. The product stream from such a process is a vapor consisting of inert gases, water, and a very small amount of maleic anhydride. Conventionally, maleic anhydride is recovered from such gas mixtures by first cooling the gas to condense about one-half of the maleic anhydride and then, after separating the condensate, scrubbing the gas stream with water. The resulting aqueous mixture of maleic anhydride is dehydrated by azeotropic distillation with xylene. This recovery process has the drawback of converting a fair amount of maleic anhydride into fumaric acid, which in turn causes plugging problems in the maleic anhydride recovery sections of the plant.

Because of the fumaric acid problem, anhydrous agents have been investigated for scrubbing dilute maleic anhydride gas streams. For example, the following agents have been tested: dibutyl phthalate (British Pat. Nos. 727,828; 763,339; 768,551), tricresyl phosphate (French Pat. No. 1,125,014), dimethylterephthalate (Japanese Pat. No. 32–8408), diphenylpentachloride (U.S. Pat. No. 2,893,924), dibutyl maleate (Japanese Pat. No. 35–7460), and high molecular weight wax (U.S. Pat. No. 3,040,059). Of these, dibutyl phthalate seems to be preferred. However, in actual use, under commercial flow rates, dibutyl phthalate is unacceptable because it is carried out of the gas scrubbing vessel in the exit gas stream. This cannot be alleviated by lowering the temperature of the scrubbing liquid. The minimum temperature permitted in the gas scrubber is set by the dew point of water. Scrubbing temperature must be kept above this value in order to prevent the condensation of water which forms maleic acid by hydrolysis of the anhydride. Maleic acid in turn isomerizes readily to the undesirable insoluble fumaric acid.

THE INVENTION

Now it has been found that maleic anhydride can be effectively recovered from a gaseous mixture containing the maleic anhydride by contacting said gaseous mixture with dialkyl phthalate having from 4 to 8 carbon atoms in each alkyl group and a total of from 10 to 14 carbon atoms in the two alkyl groups, while maintaining said dialkyl phthalate in the liquid phase and above the dew point of water. The dew point of water varies with pressure and concentration of water in the gas phase. This value may be calculated by well-known methods. For gaseous maleic anhydride-water mixtures produced by the vapor phase oxidation of hydrocarbons, the dew point is usually below about 55°C.

Surprisingly, only a relatively few dialkyl phthalate esters have both the desired solubility for maleic anhydride and the low vapor pressure necessary for use in high temperature gas scrubbers to prevent carryover loss and also to prevent losses when distilling off the lower boiling maleic anhydride in subsequent purification. These satisfactory esters are those having 4 to 8 carbon atoms in each alkyl group and a total of 10 to 14 carbon atoms in the two alkyl groups.

The dialkyl phthalate esters of this invention include the ortho, meta, and para isomers, i.e. dialkyl orthophthalate, dialkyl isophthalate, and dialkyl terephthalate. The dialkyl orthophthalates are preferred because of availability and cost considerations.

The following esters are examples of compounds suitable for use in this process: diamyl phthalate, dihexyl phthalate, diheptyl phthalate, amylhexyl phthalate, amylheptyl phthalate, hexylheptylphthalate, butyloctyl phthalate, butyl-2-ethylhexyl phthalate, amyl-2-ethylhexyl phthalate, di-2-methylpentyl phthalate, octyl-2-methylpentyl phthalate, butyl-2-methylheptyl phthalate, etc. Mixtures of two or more dialkyl phthalates are also satisfactory. Dialkyl phthalates in which both alkyl groups have the same number of carbon atoms are preferred. The orthophthalate, isophthalate and terephthalate analogs of the aforementioned dialkyl phthalate examples are all illustrative of suitable ester scrubbing agents. Dihexyl orthophthalate and di-2-methylpentyl orthophthalate are the preferred gas scrubbing agents of this invention. These compounds are all readily obtainable by the diesterification of phthalic acids or anhydrides with 4 to 8 carbon alcohols, preferably primary alcohols. The preferred esters are commercially available.

EMBODIMENT

In the preferred embodiment, a mixture of dihexyl phthalate and di-2-methylpentyl phthalate is used to absorb maleic anhydride from a hot mixture of gases. A representative mixture is the effluent product stream from a fixed catalyst bed vapor phase reactor in which a suitable hydrocarbon has been air oxidized to maleic anhydride. Typical hydrocarbon feeds include benzene, butene-1, butene-2, normal butane, and the like. Such an effluent stream ordinarily contains from ½ to 2 volume percent of maleic anhydride, from 2 to 6 volume percent water vapor, and other components such as carbon dioxide, carbon monoxide, and unconverted hydrocarbon, all in minor amounts. The major components of the product gas stream are nitrogen and oxygen.

Referring to the schematic flow diagram of the accompanying drawing, unit 3 is a 5-50 plate, preferably about 20 plate, sieve-tray scrubbing (absorption) column and unit 7 is a reduced pressure, fractional distillation column. In the continuous mode of the recovery method, the liquid dialkyl phthalate absorbent is introduced via line 2 and through indirect heat exchanger 18 to column 3 at a location above the top tray of the column. By means of the exchanger the temperature of the dialkyl phthalate is adjusted to a temperature in the range 65° to 125°C., preferably about 75°C. By means of a pressure regulator valve, not shown, the pressure in column 3 is maintained in the range 1 to 4.4 atms., preferably about 2 atms. The maleic anhydride-containing gas stream is introduced via line 4 into column 3, at a location below the bottom tray of the column, and flows upward. Thus, in countercurrent flow, the foregoing gas and liquid streams pass up and down column 3, respectively. During this passage, at least 90 percent of the maleic anhydride in the gas stream is condensed and absorbed by the dialkyl phthalate. The residual gas, including the water, carbon dioxide and the unoxidized hydrocarbon components, is vented from the process via line 5.

The scrubbing liquid flow rate is readily established and depends upon the concentration of maleic anhydride in the gaseous effluent product stream, upon the total volume of the effluent stream, and upon the desired maleic anhydride concentration for the scrubber liquid which is withdrawn from the scrubber stage. Thus, the scrubber column is sized according to the usual consideration, as known in the art, to result in an orderly flow of liquid and gas through the column. Enough trays or stages are provided so that the effluent gas stream contains but a minor amount of maleic anhydride.

The resulting pregnant dialkyl phthalate contains an amount of maleic anhydride in the range 5 to 20 weight percent, usually about 10 percent, and is withdrawn from column 3 via line 6 and passed into the distillation column 7 at a midpoint. The distillation column may be of the sieve- or bubble-tray type.

In column 7 the maleic anhydride content of the delivered stream is separated from the dialkyl phthalate by fractional distillation at or below atmospheric pressure. Desirably, a pressure in the range 0.034–0.2 atm., preferably about 0.07 atm., is used. By means of the indirect heat exchanger 9 and associated transfer lines 8 and 10, the temperature in the column 7 is maintained in the range 200°–230°C. when the pressure is about 1 psia. In this distillation, the maleic anhydride is separated as an overhead vapor fraction which is condensed by means of indirect heat exchanger 15. Part of the condensate is returned to the column via lines 16 and 17 and the balance is withdrawn via line 12 for transfer to storage or further purification, as desired. The maleic anhydride product is usually about 99 plus percent pure.

The resulting bottom fraction is dialkyl phthalate which contains a minor amount of maleic anhydride, preferably less than 1 weight percent. It is withdrawn from column 7 via line 11 for recycle to the process. If desired, as where there is a tendency for the accumulation with time of polymeric side products, a dialkyl phthalate bleed stream is withdrawn from the process via line 13. As required, fresh dialkyl phthalate is introduced to the process via line 1.

The reduction of pressure required for the distillation in column 7 is effected via line 14 by ordinary means, not shown. Similarly, pursuant to conventional practice, ordinary elements such as steam eductors, pumps, line gauges and the like have been omitted from the schematic figure.

The use of mixtures of dialkyl phthalates or of mixtures of dialkyl phthalates with other conventional non-aqueous scrubbing agents may be advantageous. Where a dialkyl phthalate is used in admixture with a conventional non-aqueous absorbent, the relative amouns of dialkyl phthalate and ordinary absorbent in the mixture should yield a homogeneous mixture and sufficient (at least about 30 mole percent) dialkyl phthalate to result in an appreciable improvement in the maleic anhydride absorption in the resulting scrubbing agent.

The method of the invention is useful, in general, for the separation of maleic anhydride from gaseous mixtures comprising water and maleic anhydride. It is useful, in general, for the recovery of vaporized maleic anhydride from the effluent product streams which result from the air or oxygen partial oxidation of a hydrocarbon feed and this use is contemplated herein.

In order to avoid hydrolysis and isomerization in the extraction of maleic anhydride from a gaseous mixture containing vaporized water and maleic anhydride, the temperature of the liquid dialkyl phthalate absorption agent must be substantially (at least about 10°C.) above the dew point for water and below the boiling point of maleic anhydride. Useful temperatures are in the range from about 55° to 260°C. under elevated pressure, if necessary, and preferably 65°C. to 135°C.

The temperature desirably used may vary depending somewhat upon the pressure. Thus, as the pressure of the contacting is increased, a relatively higher temperature is needed. Satisfactory pressures are, in general, in the range 0.07 to 7 atmospheres, preferably 0.1 to 3.5 atmospheres. Operation of the method at or near the atmospheric pressure is usually most convenient.

The manner in which the contacting is effected may vary widely and included are the usual means employed in the continuous or batch stage extraction of a gas from a mixture of gases such as:

1. introducing the gas stream into a body of the liquid agent;
2. introducing the gas stream into a descending spray of the liquid agent;
3. use of a multiplate scrubbing column of standard commercial design, such as sieve tray, bubble-cap tray, rain-deck, and the like.

The number of contact stages desirably used in the method varies depending upon the degree of recovery of the maleic anhydride desired. In general, a useful recovery is experienced from the use of a single contact stage. In order to achieve a practical recovery (in the range 90 plus percent), multistage contacting is needed. Thus, a useful result obtains from the employment of from 1 to 30 stages (theoretical), preferably 5 to 15, in the method of the invention. The corresponding range for the recovery of the maleic anhydride is 75 to 99 plus percent.

A fractional distillation, preferably under a reduced pressure, is a convenient means for the separation of the absorbed maleic anhydride from the liquid absorption agent. For this purpose a stripper column having from 1 to 20, preferably 2 to 5 stages (theoretical) is satisfactory. For the fractional distillation a reboiler temperature in the range 150°–300°C., preferably 200°–230°C., is in general satisfactory. A useful pressure for the distillation is, in general, in the range $5 \times 10^{-3}$ to 1 atmosphere, preferably $3.3 \times 10^{-2}$ to $2.6 \times 10^{-1}$ atmosphere. As a practical matter, the maleic content of the absorption agent is not completely removed. Thus, in a continuous operation a reduction of maleic content of the absorption agent in the stripper column to an amount in the range 0.2 to 1 percent (weight) is ordinarily advantageous.

The following examples further illustrate the method of the invention. The absorption agents are dialkyl phthalates as specified. The maleic anhydride-containing gas was the effluent product stream from the oxidation of an n-butane-air mixture in a vapor phase fixed bed reactor. This stream contained about 0.6 volume percent of maleic anhydride and water vapor. The contacting of the effluent oxidate gas stream with the dialkyl phthalate was effected in a 6-inch ID, 20-sieve tray column. Separation of maleic anhydride and absorbent was carried out in a 2-inch ID, 10-sieve tray column.

These examples were carried out by the process shown in the drawing. In each case, the process was carried out until steady state operation was established. Then measurements were made as to absorption efficiency, maleic anhydride recovery, maleic anhydride quality, and solvent loss.

EXAMPLE 1

Dihexyl Phthalate Scrubber Liquid

The feed gas, 870 normal (measured at 1 atm. and 21°C.) cubic feet per hour and containing 0.89 pounds of maleic anhydride per 1000 cubic feet was passed via line 4 into the scrubber 3 having a bottoms temperature at the gas inlet port of 87°C. and a temperature at the top of the scrubber at the gas outlet port of 60.5°C. The scrubber was maintained at 16 psig pressure. At the same time, 13.2 pounds per hour if dihexyl phthalate containing 1.8 percent (weight) of maleic acid, was charged to the scrubber via lines 11 and 2. The off gases, containing 0.002 pounds of maleic anhydride per 1000 cubic feet, were vented through line 5. The absorbent, now containing 7 percent (weight) maleic anhydride, was removed from the scrubber column via line 6 and charged to tray 2 of the distillation column at a rate of 14 pounds per hour.

The stripper (distillation) column was maintained at an average pressure of 50 Torr. The reboiler temperature was maintained at 217°C., and dihexyl phthalate absorbent containing 1.8 percent (weight) of maleic anhydride was removed through line 11 and recycled back to the scrubber column. Loss of dihexyl phthalate was .0016 pound per pound of maleic anhydride recovered.

Maleic anhydride product was taken overhead through line 14 at an average temperature of 113°–115°C. and removed through line 12 at a rate of 0.776 pound per hour. This maleic anhydride product had a freezing point of 52.53°C. (theory, 52.8°C.), and it was 99.6 percent pure by gas chromatographic analysis. In this example, the absorber efficiency was 99.8 percent; and the overall maleic anhydride recovery averaged 98.8 percent over a 300 hour run. There was less than 0.1 wt. percent of fumaric acid made throughout the run.

EXAMPLE 2

Butyloctyl Phthalate Scrubber Liquid

This run was carried out by the same process and in the same equipment as Example 1. The gas feed averaged 868 normal cubic feet per hour and contained 0.90 pound of maleic anhydride per 1000 cubic feet. The scrubber was maintained at a bottoms temperature of 87°C. and a temperature of 61°C. at the top, and under 16.3 psig pressure. The recycle absorbent, containing 0.2 percent (wt.) of maleic anhydride, was charged to the scrubber at 12.3 pounds per hour. The vent gases contained 0.06 pound of maleic anhydride per 1000 cubic feet indicating an absorber efficiency of 93 percent. The absorbent leaving the scrubber contained 6.5 percent (wt.) of maleic anhydride. The distillation column was maintained at the same pressure and the reboiler had an average temperature of 224°C. Maleic anhydride was taken overhead at 0.745 pound per hour at 113°C. It was 99 percent pure by a gas chromatographic analysis. In this run, the overall maleic anhydride recovery averaged 92 percent over a 300 hour period. There was less than 0.1 weight percent of fumaric acid made throughout the run. Butyloctyl phthalate make-up amounted to 0.005 pound per pound of maleic anhydride produced.

EXAMPLE 3

Dibutyl Phthalate Scrubbing Liquid

This run was carried out by the same process and in the same equipment as Example 1. The gas feed averaged 852 normal cubic feet per hour and contained about 1.38 pounds of maleic anhydride per 1000 cubic feet. The temperature at the bottom of the scrubber was 94°C. and at the top, 69°C.; the pressure was 11 psig. The recycle absorbent, containing 2.1 percent maleic anhydride, was charged to the scrubber at 12.0 pounds per hour. The off gases from the scrubber contained 0.124 pound of maleic anhydride per 1000 cubic feet, giving an absorber efficiency of 91.1 percent. The absorbent leaving the scrubber contained 9.6 percent (wt.) of maleic anhydride. The distillation column was maintained at a pressure of 50 Torr and had a reboiler temperature of 220°C. Maleic anhydride was taken overhead at 1.08 pounds per hour at 60°C. This product was water white and of high purity. Overall maleic anhydride recovery was 92 percent. However, a large amount of make-up dibutyl phthalate, 0.03 pound per pound of maleic anhydride produced, was required to maintain the absorbent level. This amounts to 10 to 20 times more make-up required of dibutyl phthalate than of butyloctyl phthalate or dihexyl phthalate, respectively. Finally the run had to be terminated after 125 hours because of an excessive buildup of fumaric acid which caused plugging and deposited as a solid throughout the apparatus. Fumaric acid recovered from the unit amounted to about 2 percent of the maleic anhydride product.

Other runs were carried out using laboratory size equipment, but the same flow scheme as shown in the drawing. In these runs, the scrubber was a 1-inch I.D., 25-sieve tray column, and the distillation column was a 1-inch I.D., 10-sieve tray column, with a feed port above the fifth tray, and product takeoff from the top.

The data from three runs are summarized in the following table.

| Example No. | 4 | 5 | 6 |
|---|---|---|---|
| Absorbent | Dioctyl Phthalate | Dihexyl Phthalate | Butyloctyl Phthalate |
| Gas feed rate, NCFH | 17.2 | 17.6 | 18.1 |
| Maleic anhydride in gas feed[1] | 0.9 | 0.9 | 0.9 |
| Absorbent feed rate, pounds per hour | 0.22 | 0.22 | 0.23 |

—Continued

| Example No. | 4 | 5 | 6 |
|---|---|---|---|
| Absorbent | Dioctyl Phthalate | Dihexyl Phthalate | Butyloctyl Phthalate |
| Maleic anhydride in absorbent in, wt. % | 2.0 | 1.8 | 0.8 |
| Maleic anhydride in absorbent out, wt. % | 7.3 | 7.5 | 8.0 |
| Absorber efficiency, % | 83 | 91 | 91 |
| Make-up absorbent[2] | 0.002 | 0.0016 | 0.009 |
| Scrubber temperature, bottom, °C. | 74 | 75.5 | 74 |
| Scrubber temperature, top, °C. | 55.5 | 55 | 54.5 |
| Scrubber pressure, psig | 5.5 | 5.5 | 5.5 |
| Distillation temperature, overhead, °C. | 112 | 111–112 | 110–112 |
| Distillation temperature, reboiler, °C. | 232 | 232 | 232 |
| Distillation pressure, Torr. | 50 | 50 | 50 |
| Maleic anhydride, % recovered | 82 | 90 | 90 |
| Maleic anhydride purity, %[3] | 99 | 99 | 99 |
| Fumaric acid, % (wt.) | < 0.1 | < 0.1 | < 0.1 |

[1] Concentration in pounds per 1000 cubic feet
[2] Amount in pounds per pound of maleic anhydride produced
[3] Measured by gas chromatography The data in the above examples clearly shows the unexpected superiority of the dialkyl phthalate scrubbing agents of this invention (Examples 1, 2, 5 and 6) over the dibutyl phthalate agent of the prior art (Example 3) and the dioctyl phthalate agent of the same chemical type but having an excessive number of carbon atoms in the two side chains (Example 4). Dibutyl phthalate fails for two reasons: (1) high make-up requirements due to losses in the scrubber and distillation column, and (2) a high fumaric acid by-product formation in the process with the resulting plugging problems. Dioctyl phthalate fails because of low absorption efficiency, resulting in unacceptable amounts of maleic anhydride lost in the vent gases.

The foregoing examples demonstrate that maleic anhydride can be effectively recovered from a gaseous mixture containing maleic anhydride and water vapor without the formation of maleic and fumaric acids by the method of the invention.

While the character of this invention has been described in detail with numerous examples, this has been done by way of illustration only and without limitation of the invention. It will be apparent to those skilled in the art that modifications and variations of the illustrative examples may be made in the practice of the invention within the scope of the following claims.

We claim:

1. The method for the recovery of maleic anhydride from a gaseous mixture containing the anhydride, which comprises contacting said mixture with a scrubbing agent in the liquid phase at a temperature below about 260°C. and at a pressure sufficient to effect maleic anhydride absorption into the liquid phase, said agent being one or more dialkyl phthalates having from 4 to 8 carbon atoms in each alkyl group and a total of 10 to 14 carbon atoms in both alkyl groups, and said pressure being in the range from about 0.07 to 7 atmospheres.

2. The method as in claim 1 wherein the mixture contains water vapor and the contact temperature is at least 10°C. above the dew point of water.

3. The method as in claim 2 wherein the contact temperature is in the range from about 55°C. to 260°C.

4. The method as in claim 2 wherein the contact temperature is in the range from about 65°C. to 135°C.

5. The method as in claim 1 wherein said scrubbing agent contains a diluent, said diluent being selected from the group consisting of ordinary non-aqueous maleic anhydride scrubbing agents, and wherein the dialkyl phthalate content of the resulting diluted agent is at least about 30 mol percent.

6. The method as in claim 1 wherein said pressure is in the range from about 0.1 to 3.5 atmospheres.

7. The method as in claim 1 wherein said pressure is about atmospheric pressure, said contact is effected in a multicontact staged column having a number of theoretical stages in the range from 1 to 30.

8. The method as in claim 1 wherein said agent is a dialkyl phthalate having both alkyl groups of the same carbon content.

9. The method as in claim 8 wherein said alkyl groups have 6 carbon atoms.

10. The method as in claim 1 wherein said agent is a dialkyl orthophthalate.

11. The method as in claim 10 wherein both alkyl groups have the same number of carbon atoms.

12. The method as in claim 11 wherein said alkyl groups have 6 carbon atoms.

13. The method for the recovery of maleic anhydride from a gaseous mixture containing maleic anhydride and water comprising:
   1. contacting said mixture with a dialkyl phthalate in the liquid phase, said contacting being in a liquid-gas contact zone at a temperature in the range from about 55°C. to 260°C., said temperature being at least about 10°C. above the dew point of water, said contacting being at a pressure in the range from about 0.07 to 7 atmospheres, and said dialkyl phthalate having from 4 to 8 carbon atoms in each alkyl group and a total of 10 to 14 carbon atoms in both alkyl groups;
   2. withdrawing a portion of the resulting solution from said zone; and
   3. separating maleic anhydride from said solution by fractional distillation.

14. The method as in claim 13 wherein said mixture is the effluent product stream from an oxidation process, said process being an air or oxygen oxidation of a vaporized hydrocarbon feed.

15. The method as in claim 13 wherein said agent is a dialkyl orthophthalate.

16. The method for the recovery of maleic anhydride from a gaseous mixture containing water, said mixture being the effluent product stream from a catalyzed air oxidation of n-butane in the vapor phase, comprising:
1. absorbing maleic anhydride from said mixture by contacting said mixture with dialkyl phthalates in the liquid phase, said dialkyl phthalates being a mixture of dihexyl orthophthalate and di-2-methylpentyl orthophthalate, said contacting being at a temperature in the range of 60° to 90°C. and a pressure of about 15 psig; and
2. withdrawing a portion of the resulting solution from said zone; and
3. separating maleic anhydride from the resulting solution by fractional distillation.

* * * * *